United States Patent
Kondo et al.

(10) Patent No.: US 7,418,654 B2
(45) Date of Patent: Aug. 26, 2008

(54) COMMUNICATION TERMINAL, STORAGE MEDIUM AND COMMUNICATION SYSTEM

(75) Inventors: Yoshiyuki Kondo, Okazaki (JP); Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 493 days.

(21) Appl. No.: 10/665,119

(22) Filed: Sep. 22, 2003

(65) Prior Publication Data
US 2004/0064200 A1    Apr. 1, 2004

(30) Foreign Application Priority Data
Sep. 30, 2002    (JP) ............... 2002-284865

(51) Int. Cl.
G06F 15/00    (2006.01)
G06F 17/00    (2006.01)
(52) U.S. Cl. .............. 715/205; 715/221; 715/230; 707/3; 707/10
(58) Field of Classification Search .............. 715/501.1, 715/205, 221, 230; 707/3, 10
See application file for complete search history.

(56) References Cited

U.S. PATENT DOCUMENTS

| | | | | |
|---|---|---|---|---|
| 5,870,767 A | | 2/1999 | Kraft, IV | |
| 5,877,759 A | * | 3/1999 | Bauer | 719/317 |
| 5,890,171 A | * | 3/1999 | Blumer et al. | 715/501.1 |
| 5,890,173 A | * | 3/1999 | Yoda | 715/501.1 |
| 6,182,072 B1 | * | 1/2001 | Leak et al. | 707/10 |
| 6,567,800 B1 | * | 5/2003 | Barrera et al. | 707/3 |

FOREIGN PATENT DOCUMENTS

| | | |
|---|---|---|
| CN | 1291853 A | 4/2001 |
| EP | 1 091 607 A2 | 4/2001 |
| JP | A 10-162030 | 6/1998 |
| JP | A 2002-244912 | 8/2002 |

OTHER PUBLICATIONS

Balachander Krishnamurthy et al., web performance by client characterization driven server adaptation, ACM, 2002, pp. 305-316.*

* cited by examiner

*Primary Examiner*—William L Bashore
(74) *Attorney, Agent, or Firm*—Oliff & Berridge, PLC

(57) ABSTRACT

A communication terminal uses a Web printing function to print a Web page of a URL designated through an operation panel, together with the URL of the Web page and an entry column for entering keywords, on a sheet of paper. When an image is read from the sheet of paper, the communication terminal specifies contents written in a specific position. When any URL is contained in the contents and any keyword is specified together with the URL, the communication terminal registers the URL and the keyword associatively in a data table. After that, a user can make the communication terminal print the Web page of the designated URL by designating the URL registered in the data table on the basis of the keyword corresponding to the URL.

17 Claims, 10 Drawing Sheets

| KEYWORD | URL |
|---|---|
| GOURMET, SAKAE, BAR | http://············ |
| GOURMET, FUSHIMI, ITALIAN | http://············ |
| GOURMET, KANAYAMA, FRENCH | http://············ |
| WEATHER, AICHI | http://············ |
| WEATHER, TYPHOON | http://············ |
| WEATHER, WEEK | http://············ |
| ⋮ | ⋮ |

```
KEYWORD PRINT
> WEATHER_
```

```
KEYWORD PRINT
  → PRINT ALL RETRIEVAL RESULTS
    AICHI      tenki/aichi/···
    TYPHOON    bousai/taifuu···
    WEEK       tenki/syuukan···
```

FIG. 9

KEYWORDS

CHECK KEYWORDS FOR RETRIEVAL

7 — GOURMET ☐ — 8

WEATHER ☐

SAKAE ☐

FUSHIMI ☐

KANAYAMA ☐

AICHI ☐

TYPHOON ☐

WEEK ☐

BAR ☐

ITALIAN ☐

FRENCH ☐

⋮      ⋮

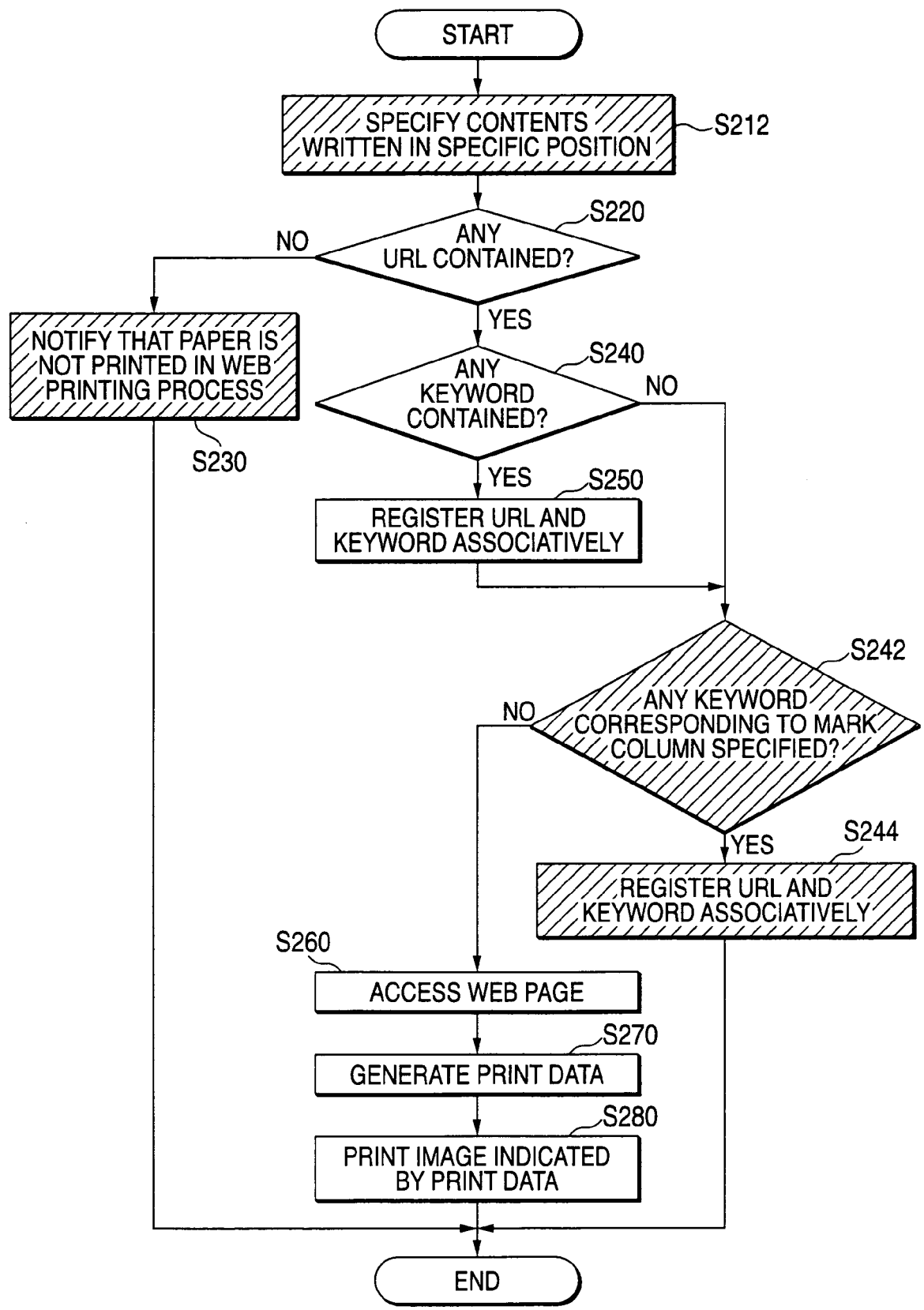

COMMUNICATION TERMINAL, STORAGE MEDIUM AND COMMUNICATION SYSTEM

BACKGROUND OF THE INVENTION

1. Field of the Invention

The present invention relates to a communication terminal used in a state where the communication terminal is connected to a network, and a storage medium storing a terminal control program for controlling the communication terminal.

2. Description of the Related Art

At present, some communication terminal, such as a composite machine or a network printer, used in a state where the communication terminal is connected to a network has a function (hereinafter referred to as "Web printing function") of printing an image of a Web page accessed through the network on a printing medium. By means of the Web printing function, the Web page can be browsed through the printing medium.

Various techniques have been proposed for improvement of convenience at the time of browsing the Web page through the printing medium in recent years.

For example, as described in JP-A-10-162030, an image obtained by addition of footnotes made of character strings (i.e., URLs) indicating access data to the image of the Web page is printed on the printing medium when access data (hyperlink address) is contained in the Web page (hypertext document).

The Web page accessed through the network often contains access data for accessing (linking) other Web pages. In the case where only the image of the Web page is printed, a judgment cannot be made as to whether access data is contained in the Web page or not and as to which Web page can be accessed from the Web page, so that access data cannot be held in the printing medium. According to the technique disclosed in JP-A-10-162030, however, the user can make a judgment on the basis of the footnotes printed on the printing medium as to whether access data is contained in the Web page and as to which Web page can be accessed from the Web page, so that access data can be held also in the printing medium.

Incidentally, when a Web page is browsed through a Web browser (WWW browser) built in a personal computer which is a kind of communication terminal, registration (i.e., so-called "bookmark registration") of access data of the Web page may be performed in order to reduce labor required for inputting access data at the time of repeatedly accessing the Web page. As a result, when a user makes a simple operation of designating registered access data, the user can access and browse the Web page of the designated access data.

If registration of access data and user's designation of registered access data (and printing the Web page of the designated access data) can be provided in a communication terminal having a Web printing function, there is an expectation that convenience can be improved more greatly at the time of browsing the Web page through the printing medium.

In the related art, however, neither registration of access data nor user's designation of registered access data was performed in the communication terminal having the Web printing function. A technique for providing the registration of access data and user's designation of registered access data has been required.

SUMMARY OF THE INVENTION

The present invention has been made to solve the above problems, and therefore an object of the invention is to provide a communication terminal having a Web printing function, in which both registration of access data and user's designation of registered access data can be provided.

According to one aspect of the invention, there is provided a communication terminal used in a state where the communication terminal is connected to a network, including: an access unit configured to access a predetermined Web page through the network on the basis of access data for accessing the predetermined Web page; a printing unit configured to print a predetermined image on a printing medium; a reading unit configured to read the image printed on the printing medium; a recording medium configured to record various pieces of data including keywords and character strings; a first print instruction unit that causes the printing unit to print a character string indicating the access data of the Web page and an entry column for making a user enter an arbitrary keyword together with an image of the Web page accessed by the access unit; a read instruction unit configured to instruct the reading unit to read the character string indicating the access data and the keyword entered in the entry column from the printing medium printed in accordance with an instruction given from the first print instruction unit; a record instruction unit that causes the recording medium to record the character string and the keyword read in accordance with an instruction given from the read instruction unit while associating the character string with the keyword; a keyword input unit configured to make the user enter an arbitrary keyword; a retrieval unit configured to retrieve a character string corresponding to the keyword entered by the keyword input unit from the character strings recorded in the recording medium; a first access instruction unit configured to instruct the access unit to access a Web page based on the access data indicated by the character string detected by the retrieval unit; and a second print instruction unit configured to instruct the printing unit to print the Web page accessed in accordance with an instruction given from the first access instruction unit.

According to another aspect of the invention, there is provided a storage medium storing a terminal control program for causing a computer system execute procedures for controlling a communication terminal used in a state where the communication terminal is connected to a network, the communication terminal including an access unit configured to access a predetermined Web page through the network on the basis of access data for accessing the predetermined Web page, a printing unit configured to print a predetermined image on a printing medium, a reading unit configured to read the image printed on the printing medium, and a recording medium configured to record various pieces of data, the terminal control program including: a first print instruction unit that instructs the printing unit to print a character string indicating the access data of the Web page and an entry column for making a user enter an arbitrary keyword together with the image of the Web page accessed by the access unit; a read instruction unit that instructs the reading unit to read the character string indicating the access data and the keyword entered in the entry column from the printing medium printed in accordance with an instruction given from the first print instruction unit; a record instruction unit that instructs the recording medium to record the character string and the keyword read in accordance with an instruction given from the read instruction unit while associating the character string with the keyword; a keyword input unit that makes the user enter arbitrary keywords; a retrieval unit that retrieves a character string corresponding to the keyword entered by the keyword input unit from character strings recorded in the recording medium; a first access instruction unit that instructs the access unit to access a Web page based on the access data indicated by the character string detected in the retrieval unit; and a second print instruction unit that instructs the printing unit to print the Web page accessed in accordance with an instruction given from the first access instruction unit.

BRIEF DESCRIPTION OF THE DRAWINGS

These and other objects and advantages of this invention will become more fully apparent from the following detailed description taken with the accompanying drawings in which:

FIG. 9 is a view showing a sheet of paper printed in the keyword notifying process;

FIG. 12 is a flow chart showing a procedure of a Web scanning process according to the third embodiment of the invention.

DETAILED DESCRIPTION OF THE PREFERRED EMBODIMENTS

Figure 1:
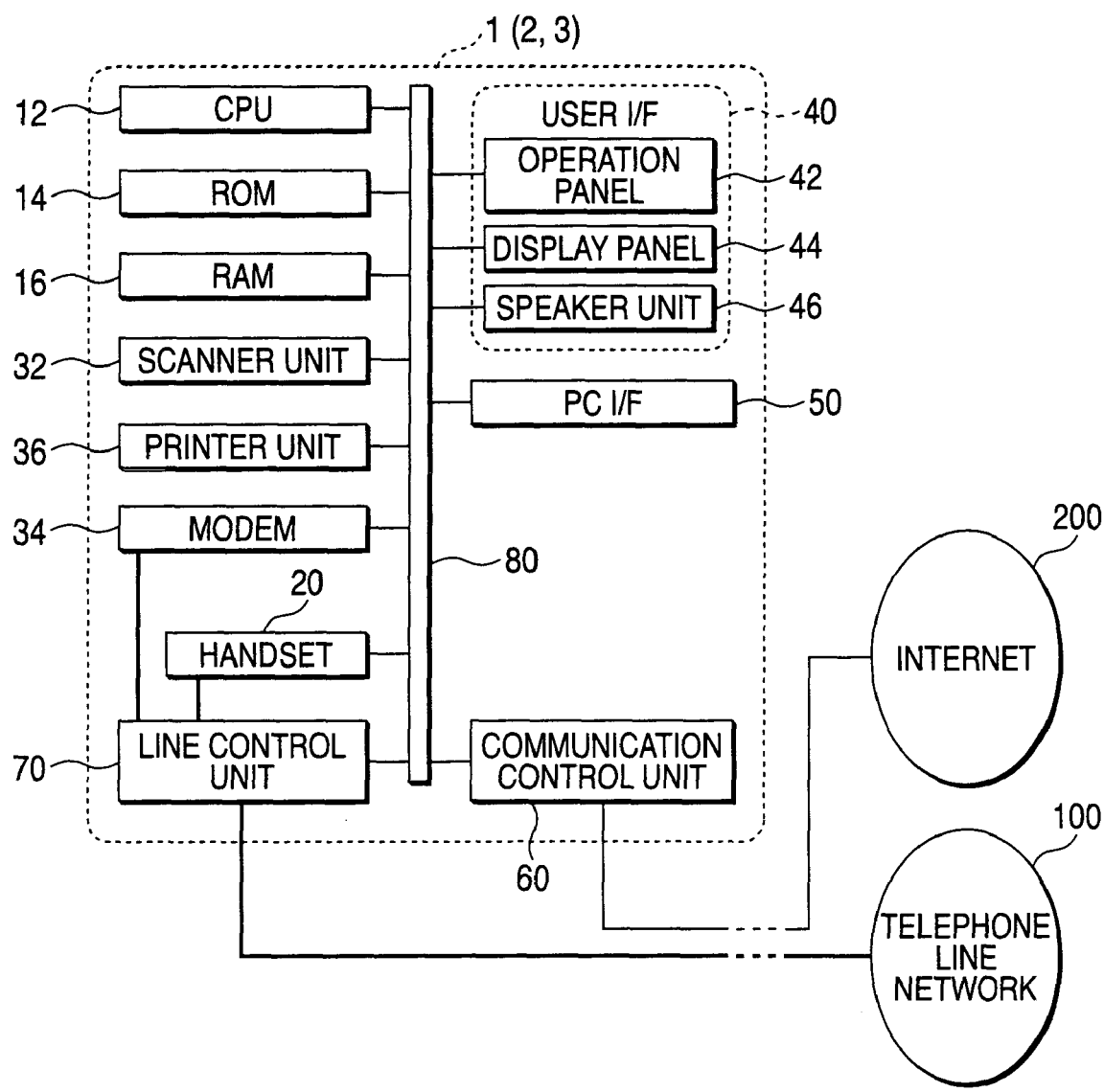
FIG. 1 is a block diagram showing a control system of a composite machine according to an embodiment of the invention.

Hereinafter, prior to describing a preferred embodiment of the invention, various aspects of the invention will be described.

(1) A communication terminal according to a first aspect of the invention is a communication terminal used in a state where the communication terminal is connected to a network, including an access unit for accessing a predetermined Web page through the network on the basis of access data for accessing the predetermined Web page, a printing unit for printing a predetermined image on a printing medium, a reading unit for reading the image printed on the printing medium, and a recording medium for recording various pieces of data.

In the communication terminal, a first print instruction unit instructs the printing unit to print a character string indicating the access data of the Web page and an entry column for making a user enter an arbitrary keyword together with the image of the Web page accessed by the access unit. In this manner, the communication terminal has a function (hereinafter referred to as "Web printing function") of printing an image of a Web page accessed through the network on a printing medium.

Further, a read instruction unit instructs the reading unit to read the character string indicating the access data and the keyword entered in the entry column from the printing medium printed in accordance with an instruction given from the first print instruction unit. A record instruction unit instructs the recording medium to record the character string and the keyword read in accordance with an instruction given from the read instruction unit while associating the character string with the keyword.

When arbitrary keywords are then input by the keyword input unit, a retrieval unit retrieves character strings corresponding to the keywords entered by the keyword input unit from character strings recorded in the recording medium.

Then, a first access instruction unit instructs the access unit to access Web pages based on the access data indicated by the character strings detected by the retrieval unit. A second print instruction unit instructs the printing unit to print the Web pages accessed in accordance with an instruction given from the first access instruction unit.

According to the communication terminal configured as described above, when a character string indicating access data and a keyword entered in the entry column are read from the printing medium by the reading unit instructed by the read instruction unit, the character string indicating access data and the keyword read by the reading unit can be recorded in the recording medium instructed by the record instruction unit while the character string and the keyword are associated with each other. Accordingly, when the printing medium is read by the reading unit after the user enters an arbitrary keyword in the entry column on the printing medium printed by the printing unit instructed by the first print instruction unit, the keyword and the character string indicating access data read thus can be recorded (registered) while associated with each other. Particularly in this configuration, it is unnecessary to provide any exclusive operation portion operating to record (the character string indicating) access data and it is unnecessary to set any special operating procedure for recording access data for an existing operation portion.

When keywords are input by the keyword input unit, character strings corresponding to the input keywords can be retrieved by the retrieval unit from character strings recorded in the recording medium. After Web pages based on access data indicated by the character strings detected by the retrieval are accessed by the access unit instructed by the first access instruction unit, the accessed Web pages can be printed by the printing unit instructed by the second print instruction unit. Accordingly, the user can designate (character strings indicating) access data registered in the recording medium on the basis of keywords corresponding to the access data, so that Web pages of the designated access data can be printed. Particularly since access data associated with arbitrary keywords entered by the user are recorded in the recording medium, access data of Web pages to be browsed by the user can be accurately designated if character strings indicating access data are recorded while associated with keywords reflecting contents of information provided by Web pages of access data.

Incidentally, the access unit is a unit for accessing a predetermined Web page through the network on the basis of access data for accessing the predetermined Web page. That is, the access unit is a unit for requesting a server connected through the network to sent the Web page and receiving the Web page sent from the server in response to the request. Here, the "network" may be a WAN (Wide Area Network) such as the Internet or may be an LAN (Local Area Network).

The first print instruction unit is a unit for instructing the printing unit to print the character string indicating access data and the entry column together with the image of the Web page. For example, the character string and the entry column may be formed to be printed in a specific position (region) of the printing medium. The character string and the entry column may be also formed to be printed together with identification information (characters, symbols, graphics, etc.) for being capable of identifying the positions of the character string and the entry column.

The read instruction unit is a unit for instructing the reading unit to read the character string indicating access data and the keyword entered in the entry column from the printing medium. For example, configuration may be made so that, after the whole image of the printing medium is read, the position of the character string and the entry column contained in the image are specified and the character string and the keyword entered in the entry column are extracted from the specified position. If the position (region) of the character string and the entry column in the printing medium can be specified, configuration may be made so that only the character string and the keyword entered in the entry column are read. To specify the position of the character string and the entry column, when, for example, the character string and the entry column are printed in a specific position of the printing medium, the specific position may be set in advance. When the character string and the entry column are printed together with identification information (characters, symbols, graphics, etc.) for being capable of identifying the positions of the character string and the entry column respectively, configuration may be made so that the positions of the character string and the entry column are specified on the basis of the identification information.

The first access instruction unit is a unit for instructing the access unit to access a Web page of access data indicated by the character string detected by the retrieval unit. When a plurality of character strings are detected by the retrieval unit, the first access instruction unit is formed to instruct the access unit to access Web pages of access data indicated by all the character strings.

When a plurality of character strings are detected by the retrieval unit, the plurality of character strings, however, may contain character strings indicating access data for Web pages that the user does not want to browse through the printing medium. It is therefore preferable that the first access unit is formed so that Web pages to be accessed by instructing the access unit (i.e., to be printed) can be selected by the user.

(2) Specifically, according to a second aspect of the invention, the communication terminal further includes a page selection unit for making the user select Web pages with images to be printed from the Web pages of the access data indicated by the character strings detected by the retrieval unit, wherein the first access instruction unit instructs the access unit to access the Web pages selected by the page selection unit.

According to the communication terminal configured as described above, the user can select Web pages with images to be printed (i.e., to be accessed by instructing the access unit) through the page selection unit. Accordingly, if character strings indicating access data of Web pages that the user does not want to browse through the printing medium are contained in a plurality of character strings detected by the retrieval unit, the user can select Web pages except the unnecessary Web pages to thereby prevent the Web pages unnecessary to be browsed from being printed wastefully.

The keyword input unit is a unit for making the user enter arbitrary keywords.

(3) For example, according to a third aspect of the invention, the keyword input unit is formed so that the user operates keys to input keywords.

According to the communication terminal configured as described above, the user can input arbitrary keywords by a key operation through the keyword input unit.

(4) In the communication terminal according to a fourth aspect of the invention, the keyword input unit may be formed so that keywords printed on the printing medium are read by the reading unit and input.

That is, according to the invention defined in (4), the communication terminal further includes a third print instruction unit for instructing the printing unit to print all keywords recorded in the recording medium and first mark columns corresponding to the keywords in response of the user's operation, wherein the keyword input unit instructs the reading unit to read marked ones of the first mark columns from the printing medium printed in accordance with an instruction given from the third print instruction unit and uses keywords corresponding to the marked ones of the first mark columns read by the reading unit as the keywords input by the user.

According to the communication terminal configured as described above, all the keywords recorded in the recording medium and the first mark columns corresponding to the keywords can be printed by the printing unit instructed by the third print instruction unit. Accordingly, the user can confirm keywords corresponding to the first mark columns, that is, registered keywords, on the basis of the first mark columns printed on the printing medium.

Marked ones of the first mark columns are read from the printing medium by the reading unit instructed by the keyword input unit, so that keywords corresponding to the marked ones of the first mark columns read thus are used as keywords input by the user. Accordingly, when the printing medium is read by the reading unit after the user marks required ones of the first mark columns printed on the printing medium, keywords corresponding to the marked ones of the first mark columns can be input.

Incidentally, the third print instruction unit is a unit for instructing the printing unit to print all keywords recorded in the recording medium and the first mark columns corresponding to the keywords in response to the user's operation. For example, the third print instruction unit may be formed so that the keywords and the first mark columns are printed on a specific position (region) of the printing medium. The third print instruction unit may be also formed so that the keywords and the first mark columns are printed together with identification information (characters, symbols, graphics, etc.) for being capable of identifying the positions of the keywords and the first mark columns respectively.

The keyword input unit is formed so that marked ones of the first mark columns are read from the printing medium and keywords corresponding to the marked ones of the first mark columns read thus are used as keywords input by the user. To read marked ones of the first mark columns, for example, after the whole image on the printing medium is read, the positions of the first mark columns contained in the image may be specified so that the marked ones of the first mark columns are extracted from the specified positions. If the positions (regions) of the first mark columns on the printing medium can be specified, configuration may be made so that only the marked ones of the first mark columns are read. To specify the positions of the first mark columns, when, for example, the first mark columns are printed on specific positions of the printing medium, the specific positions may be set in advance.

When the first mark columns are printed together with identification information (characters, symbols, graphics, etc.) for being capable of identifying the positions of the first mark columns respectively, configuration may be made so that the positions are specified on the basis of the identification information.

(5) In the communication terminal according to a fifth aspect of the invention, the first print instruction unit instructs the printing unit to print keywords recorded in the recording medium and second mark columns corresponding to the keywords as well as the character string and the entry column. Further, the read instruction unit instructs the reading unit to read marked ones of the second mark columns as well as the character string and the keywords from the printing medium printed in accordance with an instruction given from the first print instruction unit. Further, the record instruction unit instructs the recording medium to record the keywords corresponding to the second mark columns while associating the keywords with the character string read together with the second mark columns when the second mark columns are read in accordance with an instruction given from the read instruction unit.

According to the communication terminal configured as described above, keywords recorded in the recording medium and second mark columns corresponding to the keywords can be printed as data as well as the character string and the entry column by the printing unit instructed by the first print instruction unit. When marked ones of the second mark columns are read from the printing medium by the reading unit instructed by the read instruction unit, keywords corresponding to the marked ones of the second mark columns read thus can be recorded in the recording medium instructed by the read instruction unit. Accordingly, when keywords that the user wants to record (register) so as to be associated with character strings indicating access data are present in the keywords corresponding to the second mark columns printed on the printing medium, that is, in the recorded (registered) keywords, the character strings indicating access data can be recorded so as to be associated with the keywords corresponding to marked ones of the second mark columns without the necessary of writing any keyword in the entry column if the printing medium is read by the reading unit after the user marks required ones of the second mark columns corresponding to the keywords.

According to this configuration, when required ones of the second mark columns are marked and read by the reading unit, character strings indicating access data can be recorded so as to be associated with keywords corresponding to the second mark columns, that is, the same keywords as recorded keywords. Accordingly, even if keywords different from or similar to the registered keywords are written in the entry column by mistake, a plurality of access data to be recorded so as to be associated with one keyword can be prevented from being recorded so as to be associated with different keywords respectively.

Incidentally, the first print instruction unit instructs the printing unit to print keywords recorded in the recording medium and second mark columns corresponding to the keywords respectively as well as the character string and the entry column. In this case, for example, configuration may be made so that the keywords and the second mark columns are printed on specific positions (regions) of the printing medium. Configuration may be made so that the keywords and the second mark columns are printed together with identification information (characters, symbols, graphics, etc.) for being capable of identifying the positions of the keywords and the second mark columns.

The reading instruction unit instructs the reading unit to read marked ones of the second mark columns as other data than the character string and the keywords from the printing medium printed in accordance with an instruction given from the first print instruction unit. In this case, configuration may be made so that, for example, after the whole image on the printing medium is read, the positions of the second mark columns contained in the image are specified and marked ones of the second mark columns are extracted from the specified positions. If the positions (regions) of the second mark columns on the printing medium can be specified, configuration may be made so that only the marked ones of the second mark columns are read. To specify the positions of the second mark columns, when, for example, the second mark columns are printed on specific positions of the printing medium, the specific positions may be set in advance. When the second mark columns are printed together with identification information (characters, symbols, graphics, etc.) for being capable of identifying the positions of the second mark columns respectively, configuration may be made so that the positions are specified on the basis of the identification information.

(6) According to a sixth aspect of the invention, the communication terminal further includes: a second access instruction unit for instructing the access unit to access a Web page based on the access data indicated by the character string when only the character string is read in accordance with an instruction given from the read instruction unit; and a fourth print instruction unit for instructing the printing unit to print the Web page accessed in accordance with an instruction given from the second access instruction unit.

According to the communication terminal configured as described above, when only the character string is read by the reading unit instructed by the read instruction unit, the Web page of the access data indicated by the character string can be printed by the printing unit. Accordingly, when the sheet of paper on which the image of the Web page is printed by the printing unit instructed by the first print instruction unit is read by the reading unit in the condition that no character is written in the entry column, the Web page can be repeatedly printed to be browsed without necessity of performing a series of operations for printing the Web page. Accordingly, when, for example, the contents of the Web page printed by the printing unit instructed by the first print instruction unit are updated frequently, the image of the Web page having newly updated contents can be printed to be browsed by a simple operation of instructing the reading unit to read the sheet of paper with the printed image of the Web page in the condition that no character is written in the entry column.

(7) A storage medium storing a terminal control program according to a seventh aspect of the invention is a storage medium storing a terminal control program for making a computer system execute various kinds of procedures for controlling a communication terminal used in a state in which the communication terminal is connected to a network, the communication terminal including an access unit for accessing a predetermined Web page through the network on the basis of access data for accessing the predetermined Web page, a printing unit for printing a predetermined image on a printing medium, a reading unit for reading the image printed on the printing medium, and a recording medium for recording various pieces of data, the terminal control program including: a first print instruction procedure for instructing the printing unit to print a character string indicating the access data of the Web page and an entry column for making a user enter an arbitrary keyword together with the image of the Web page accessed by the access unit; a read instruction procedure for instructing the reading unit to read the character string indicating the access data and the keyword entered in the entry column from the printing medium printed in accordance with an instruction given from the first print instruction procedure; a record instruction procedure for instructing the recording medium to record the character string and the keyword read in accordance with an instruction given from the read instruction procedure while associating the character string with the keyword; a keyword input procedure for making the user enter arbitrary keywords; a retrieval procedure for retrieving character strings corresponding to the keywords entered in the keyword input procedure from character strings recorded in the recording medium; a first access instruction procedure for instructing the access unit to access Web pages based on the access data indicated by the character strings detected in the retrieval procedure; and a second print instruction procedure for instructing the printing unit to print the Web pages accessed in accordance with an instruction given from the first access instruction procedure.

The computer system controlled by the program can form part of the communication terminal according to the invention defined in (1). Accordingly, in the communication terminal having the computer system as part, the same operation and effect as those of the communication terminal according to the invention defined in (1) can be obtained.

The terminal control program according to the invention defined in (7) may be provided as a program which includes a page selection procedure for making the user select a Web page in the same manner as in the page selection unit according to the invention defined in (2) and in which in the first access instruction procedure, the access unit is instructed to access the Web page selected in the page selection procedure. In this case, the computer system can form part of the communication terminal according to the invention defined in (2). Accordingly, in the communication terminal having the computer system as part, the same operation and effect as those of the communication terminal according to the invention defined in (2) can be obtained.

The terminal control program according to the invention defined in (7) may be provided as a program in which in the keyword input procedure, the user input keywords by key operation. In this case, the computer system can form part of the communication terminal according to the invention defined in (3). Accordingly, in the communication terminal having the computer system as part, the same operation and effect as those of the communication terminal according to the invention defined in (3) can be obtained.

The terminal control program according to the invention defined in (7) may be provided as a program which includes a third print instruction procedure for instructing the printing unit to print keywords and first mark columns corresponding to the keywords respectively in the same manner as in the third print instruction unit according to the invention defined in (4) and in which in the keyword input procedure, marked ones of the first mark columns are read from the printing medium printed in accordance with an instruction given from the third print instruction procedure and keywords corresponding to the marked ones of the first mark columns read thus are used as keywords input by the user. In this case, the computer system can form part of the communication terminal according to the invention defined in (4). Accordingly, in the communication terminal having the computer system as part, the same operation and effect as those of the communication terminal according to the invention defined in (4) can be obtained.

The terminal control program according to the invention defined in (7) may be provided as a program in which: in the first print instruction procedure, the printing unit is instructed to print keywords recorded in the recording medium and second mark columns corresponding to the keywords respectively as well as the character string and the entry column; in the read instruction procedure, the reading unit is instructed to read marked ones of the second mark columns as well as the character string and the keywords from the printing medium printed in accordance with an instruction given from the first print instruction procedure; and when the second mark columns are read in accordance with an instruction given from the read instruction procedure, in the record instruction procedure, the recording medium is instructed to record the keywords corresponding to the second mark columns while associating the keywords with the character strings read together with the second mark columns. In this case, the computer system can form part of the communication terminal according to the invention defined in (5). Accordingly, in the communication terminal having the computer system as part, the same operation and effect as those of the communication terminal according to the invention defined in (5) can be obtained.

The terminal control program according to the invention defined in (7) may be provided as a program which includes a second access instruction procedure for instructing the access unit to access a Web page based on access data indicated by the character string read in accordance with an instruction given from the read instruction procedure, and a fourth print instruction procedure for instructing the printing unit to print the Web page accessed in accordance with an instruction given from the second access instruction procedure in the same manner as in the respective units according to the invention defined in (6). In this case, the computer system can form part of the communication terminal according to the invention defined in (6). Accordingly, in the communication terminal having the computer system as part, the same operation and effect as those of the communication terminal according to the invention defined in (6) can be obtained.

Incidentally, the terminal control programs are provided to the communication terminal per se, the computer system or the user of the terminal/system through a recording medium such as an FD, a CD-ROM or a memory card or through a communication line network such as the Internet. For example, a computer system built in the communication terminal or a computer system connected to the body of the communication terminal by radio or through a wire communication path to make data communication possible can be used as the computer system for executing these terminal control programs.

Referring now to the accompanying drawings, a description will be given in detail of an embodiment of the invention.

The case where the configuration of the invention is applied to a composite machine will be described below.

First Embodiment

A composite machine 1 has a function of providing voice communication through a telephone line network 100, a function of transmitting/receiving an image through the telephone line network 100, and a function of providing data communication through the Internet 200.

As shown in FIG. 1, the composite machine 1 includes a CPU 12, an ROM 14, an RAM 16, a handset 20, a scanner unit 32, a modem 34, a printer unit 36, a user interface unit (hereinafter referred to as user I/F) 40, a PC interface unit (hereinafter referred to as PC I/F) 50, a communication control unit 60, and a line control unit 70 which are connected to one another through a bus 80.

Figures 2, 3:
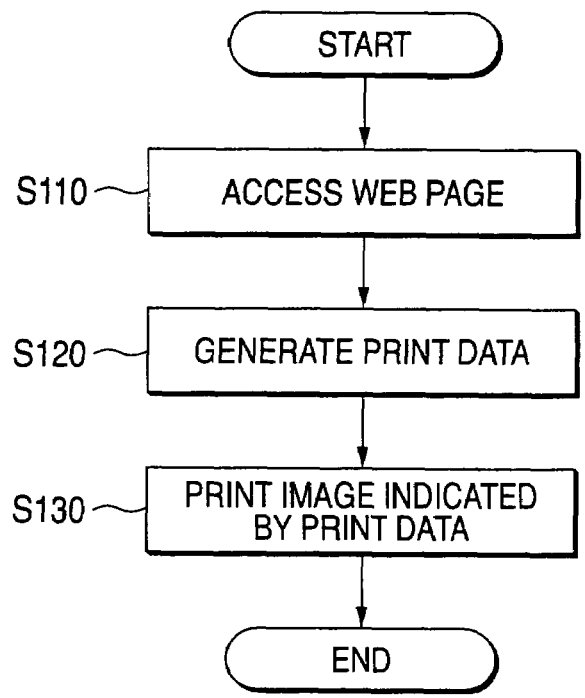
FIG. 2 is a view showing a data structure of a data table recorded in an RAM.
FIG. 3 is a flow chart showing a procedure of a Web printing process.

The CPU 12 controls the operation of the composite machine 1 totally by sending commands to the respective constituent members of the composite machine 1 through the bus 80 while making the RAM 16 store results of processing in accordance with a procedure stored in the ROM 14 in advance. Incidentally, the ROM 14 contains a communication software program for providing a function of accessing a Web page by requesting a server connected to the Internet 200 to send the Web page through the communication control unit 60 and by receiving the Web page transmitted from the server through the communication control unit 60 in response to the request. A data table generated and registered in a Web scanning process (FIG. 5) which will be described later and in which URLs (Uniform Resource Locators) of Web pages and predetermined keywords are associatively registered as shown in FIG. 2 is recorded in the RAM 16.

The handset 20 is a transmitter-receiver which can be detached from a body of the composite machine 1 when in use.

Upon reception of a command from the CPU 12, the scanner unit 32 reads an image from a sheet of paper set in a predetermined reading position (not shown) and generates image data corresponding to the image.

Upon reception of a command from the CPU 12, the modem 34 generates an image signal transmissible through the telephone line network 100 by modulating the image data generated in the scanner unit 32 or generates image data by demodulating the image signal input through the line control unit 70 from the telephone line network 100.

Upon reception of a command from the CPU 12, the printer unit 36 prints (types) an image on a sheet of paper set in a predetermined paper feed position (not shown).

The user I/F 40 includes an operation panel 42 having a plurality of keys and switches, a display panel 44 for displaying various kinds of information, and a speaker unit 46 having a speaker and a drive circuit for driving the speaker. Of the constituent members of the user I/F 40, the operation panel 42 has: a plurality of character keys capable of inputting characters, numbers and symbols; a Web print key for starting printing of a Web page in a Web printing process (FIG. 3) which will be described later; a scan key for starting reading of an image in the scanner unit 32 in the Web scanning process (FIG. 5) which will be described later; a retrieval start key for starting keyword retrieval in a Web searching process (FIG. 6) which will be described later; and a retrieval interrupt key for interrupting keyword retrieval in the Web searching process.

The PC I/F 50 is an interface for connecting the composite machine 1 to another computer system through a communication cable so that the PC I/F 50 enables data communication between the composite machine 1 and the computer system.

Upon reception of a command from the CPU 12, the communication control unit 60 receives data packet by packet from the outside of the composite machine 1 as input data or sends data packet by packet to the outside of the composite machine 1 as output data.

The line control unit 70 receives a signal (audio/video signal) from the telephone line network 100 as an input signal and sends a signal to the telephone line network 100 as an output signal. Upon reception of a command from the CPU 12, the line control unit 70 sets a transmission path for a destination and a source of the input/output signal between the line control unit 70 and the telephone line network 100. When an operation (off-hook operation) of detaching the handset 20 from the body of the composite machine 1 is carried out, a path from the line control unit 70 to the handset 20 is set as the "transmission path for a destination and a source of the input/output signal between the line control unit 70 and the telephone line network 100" so that an audio signal is enabled to be transmitted through the path. When an operation (on-hook operation) of returning the handset 20 to the body of the composite machine 1 is carried out, the transmission path set thus is cancelled so that the audio signal is disabled from being transmitted through the path. When an operation of sending an image (through FAX transmission) is carried out through the operation panel 42 or when an image signal is received, a path to the modem 34 is set as the transmission path so that an image signal is enabled to be transmitted through the path. When the output of the image signal from the modem 34 is completed or when the input of the image signal through the telephone line network 100 is completed, the transmission path set thus is cancelled so that the image signal is disabled from being transmitted through the path.

Incidentally, though detailed description will be omitted, a part of a telephone line for connecting the line control unit 70 to the telephone line network 100 is used also as a part (a section from the user side to the telephone office side) of the transmission path from the communication control unit 60 to the Internet 200 in the composite machine 1. In this section, a signal transmitted through the telephone line network 100 and packet data transmitted through the Internet 200 are transmitted while superposed on each other by ADSL (asymmetric digital subscriber line) technology.

Web Printing Process by CPU 12

The Web printing process executed by the CPU 12 included in the composite machine 1 will be described below with reference to FIG. 3. The Web printing process is started when the Web print key is pushed down after an operation of designating a URL of a Web page (an operation of entering a URL by character keys) is performed by the operation panel 42.

The CPU 12 first accesses the Web page of the URL designated by the operation panel 42 (S110). In the step S110, the CPU 12 requests a server to send the Web page of the URL designated by the operation panel 42 and receives the Web page sent from the server in response to the request to thereby access the Web page of the URL designated by the operation panel 42.

Figure 4:
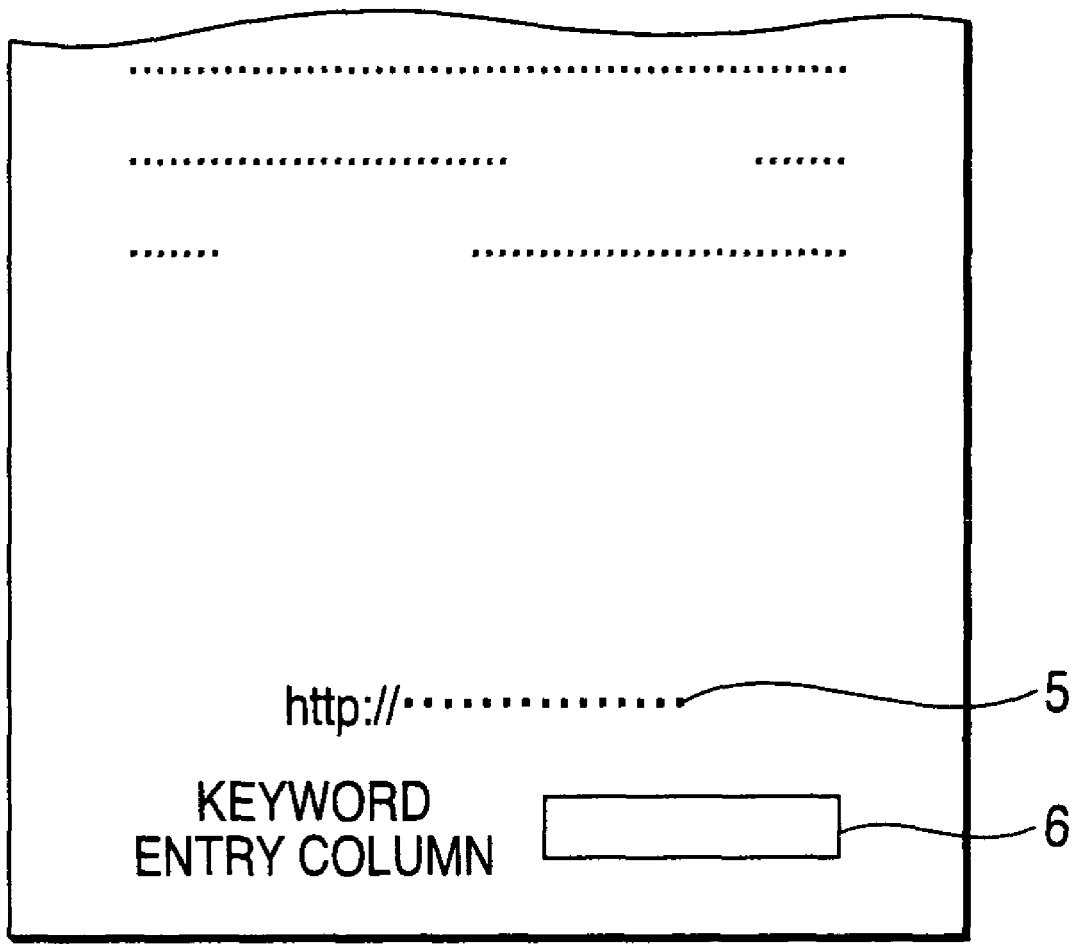
FIG. 4 is a view showing a sheet of paper printed in the Web printing process according to a first or second embodiment of the invention.

The CPU 12 then generates print data (S120). In the step S120, as shown in FIG. 4, image data of an image obtained by addition of a character string 5 indicating the URL of the Web page, and a entry column 6 for making a user enter an arbitrary keyword to a specific position (region) at a lower end of an image of the Web page accessed in the step S110 is generated as the print data.

Then, the CPU 12 operates so that the image indicated by the print data generated in the step S120 is printed on a sheet of paper (S130). In this step S130, the printer unit 36 is instructed to print the image indicated by the print data generated in the step S120. Upon reception of the instruction, the printer unit 36 prints the image indicated by the print data, on a sheet of paper (see FIG. 4). In this manner, the composite machine 1 provides a function (Web printing function) of printing the image of the Web page accessed through the Internet 200.

Web Scanning Process by CPU 12

The Web scanning process executed by the CPU 12 included in the composite machine 1 will be described below with reference to FIG. 5. The Web scanning process is started when the scan key on the operation panel 42 is pushed down in the condition that the sheet of paper printed in the Web printing process (FIG. 3) is set in a predetermined reading position.

The CPU 12 first operates to read the image from the specific position (region) of the sheet of paper and specify contents written in the specific position (S210) In this step S210, the scanner unit 32 is first instructed to read the image from the specific position (region) of the sheet of paper. Upon reception of the instruction, the scanner unit 32 reads the image from the specific position of the sheet of paper. The term "specific position" means a position set in advance as coordinates indicating positions where the character string 5 and the entry column b are printed in the Web printing process (FIG. 3). The scanner unit 32 reads the image from the position indicated by the coordinates. Then, a process (OCR: Optical Character Recognition) of recognizing characters written in positions corresponding to the character string 5 and the entry column 6 respectively is carried out on the basis of the read image. In this manner, a character string 5 indicating a URL is specified if the character string 5 is written in the specific position, and a keyword is specified if the keyword is written in the entry column 6 in the specific position.

The CPU 12 then checks whether any URL is contained in the contents specified in the step S210 or not (S220). Only when the character string 5 specified in the step S210 contains characters "http://", a decision is made in the step S220 that a URL is contained in the contents specified in the step S210.

When making a decision in the step S220 that no URL is contained (S220: NO), the CPU 12 provides information of the fact that the sheet of paper set in the reading position is not the sheet of paper printed in the Web printing process (FIG. 3) (S230). In the step S230, a control signal for displaying a message indicating that the sheet of paper set in the reading position is not the sheet of paper printed in the Web printing process is sent to the display panel 44. Upon reception of the control signal as an input signal, the display panel 44 displays the message.

After the completion of the step S230, CPU 12 terminates the Web scanning process.

When making a decision in the step S220 that a URL is contained (S220: YES), the CPU 12 checks whether any keyword is contained in the contents specified in the step S210 or not (S240). Only when any character string (i.e., any keyword) is recognized from a position corresponding to the entry column 6 in the contents specified in the step S210, a decision is made in the step S240 that any keyword is contained in the contents specified in the step S210.

When making a decision in the step S240 that a keyword is contained (S240: YES), CPU 12 registers the URL (character string 5) specified in the step S210 in the data table recorded in the RAM 16 while associating the URL with the character string indicating the keyword specified together with the URL (S250). Incidentally, if there is no data table recorded in the RAM 16, a data table is generated in the RAM 16 in the step S250 so that the character string 5 indicating the URL specified in the step S210 is registered in the data table while associated with the character string indicating the keyword specified together with the URL.

On the other hand, when making a decision in the step S240 that no keyword is contained (S240: NO), the CPU 12 accesses the Web page of the URL specified in the step S210 (S260). In the step S260, the CPU 12 requests a server to send the Web page of the URL specified in the step S210 and receives the Web page sent from the server in response to the request to thereby access the Web page of the URL specified in the step S210.

The CPU 12 then generates print data (S270). In the step S270, image data of the Web page accessed in the step S260 is generated as the print data.

Then, the CPU 12 operates so that an image expressed by the print data generated in the step S270 is printed on a sheet of paper (S280). In the step S280, the image expressed by the print data generated in the step S260 is printed on a sheet of paper in the same manner as in the step S130 in FIG. 3.

After the image is printed in the step S280, after information is made in the step S230 or after registration in the data table is made in the step S250 as described above, the CPU 12 terminates the Web scanning process.

Web Searching Process by CPU 12

The Web searching process executed by the CPU 12 included in the composite machine 1 will be described below with reference to FIG. 6. The Web searching process is started when the retrieval start key on the operation panel 42 is pushed down. Incidentally, the Web searching process is terminated when the retrieval interrupt key is pushed down during the process.

Figures 7A, 7B, 8:
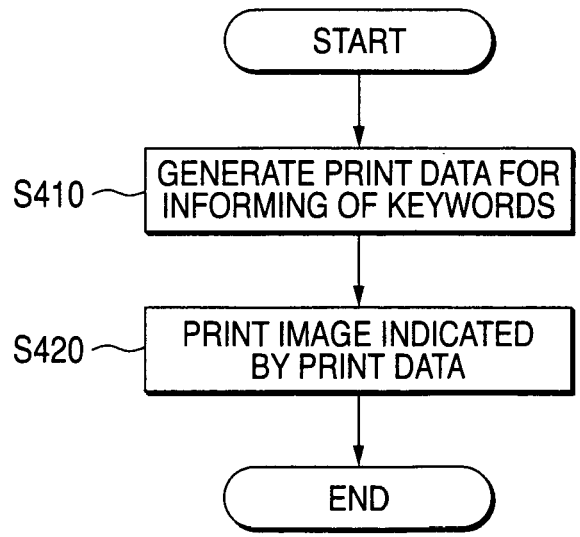
FIG. 7A is a view showing a keyword input screen.
FIG. 7B is a view showing a URL list screen.
FIG. 8 is a flow chart showing a procedure of a keyword notifying process according to the second embodiment of the invention.

The CPU 12 first operates so that a keyword input screen is displayed (S310). In the step S310, a control signal for displaying the keyword input screen for making a user enter an arbitrary keyword is sent to the display panel 44. Upon reception of the control signal as an input signal, the display panel 44 displays the keyword input screen as shown in FIG. 7A. After the keyword input screen is displayed, the user can carry out an operation of inputting an arbitrary keyword through the character keys of the operation panel 42 and an operation of pushing down the retrieval start key.

The CPU 12 then waits till the retrieval start key is pushed down (S320: NO).

If there is no keyword input in the keyword input screen displayed in the step S310 (S330: NO) when the retrieval start key is pushed down in the step S320 (S320: YES), the CPU 12 returns to the step S310.

On the other hand, if there is any keyword input in the keyword input screen displayed in the step S310 (S330: YES), the CPU 12 retrieves a URL corresponding to the keyword input in the keyword input screen displayed in the step S310 from URLs registered in the data table on the basis of the data table recorded in the RAM 16 (S340).

When there is no URL detected in the step S340 (S340: NO), the CPU 12 returns to the step S310.

On the other hand, when there is any URL detected in the step S340 (S340: YES), the CPU 12 operates so that a URL list screen is displayed (S350). In the step S350, a control signal for displaying the URL list screen indicating a list of URLs detected in the step S340 is sent to the display panel 44. Upon reception of the control signal as an input signal, the display panel 44 displays the URL list screen as shown in FIG. 7B. Incidentally, in the URL list screen, respective URLs are displayed together with keywords except the keyword input in the keyword input screen displayed in the step S310 in keywords corresponding to the URLs. After the URL list screen is displayed, the user can carry out an operation of selecting any URL from the displayed URLs or selecting all the URLs through the operation panel 42 (by moving the cursor "→" in FIG. 7B through the operation panel 42).

Then, the CPU 12 waits till the URL selecting operation is completed (S360: NO).

When the URL selecting operation is performed in the step S360 (S360: YES), the CPU 12 accesses the Web page of the selected URL (S370). In the step S370, the CPU 12 requests a server to send the Web page of the URL selected in the step S360 and receives the Web page sent from the server in response to the request to thereby access the Web page of the URL selected in the step S360. Incidentally, when an operation of selecting all URLs is carried out in the step S360, the CPU 12 requests the server to send the Web pages of all the URLs and receives the Web pages.

The CPU 12 then generates print data (S380). In the step S380, image data of the Web page accessed in the step S370 is generated as the print data. Incidentally, when a plurality of Web pages are accessed in the step S370, print data corresponding to the plurality of Web pages are generated.

Then, the CPU 12 operates so that an image expressed by the print data generated in the step S380 is printed on a sheet of paper (S390). In the step S390, an image expressed by the print data generated in the step S380 is printed on a sheet of paper in the same manner as in the step S280 in FIG. 5. Incidentally, when a plurality of print data are generated in the step S380, images expressed by the plurality of print data respectively are printed.

Advantages of the First Embodiment

Figure 5:
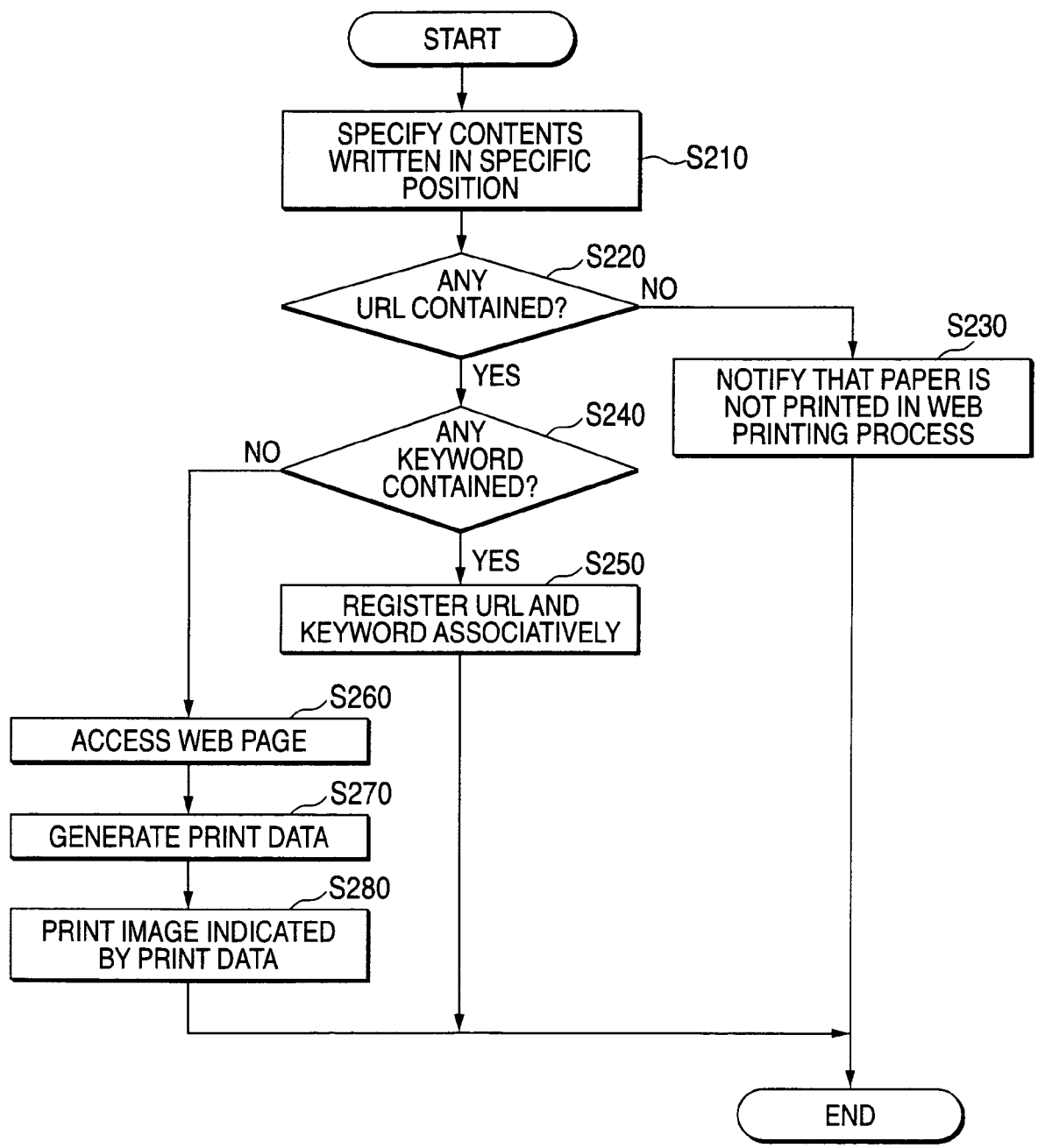
FIG. 5 is a flow chart showing a procedure of a Web scanning process according to the first or second embodiment of the invention.

According to the composite machine 1 configured as described above, the character string 5 indicating a URL and the keyword written in the entry column 6 are read as contents written in the specific position of the sheet of paper in the step S210 in FIG. 5, so that the URL and the keyword read in the step S210 can be associatively registered in the data table (recorded in the RAM 16) in the step S250. Accordingly, when the sheet of paper is read by the composite machine 1 (Web command process in FIG. 5) after the user enters an arbitrary keyword in the entry column 6 on the sheet of paper printed in the Web printing process in FIG. 3, the keyword and the URL read can be registered in the data table so as to be associated with each other. Particularly according to this configuration, it is unnecessary to provide any exclusive operation portion (such as an operation switch/key) for making an operation of registering the URL or it is unnecessary to set any special operating procedure for registering the URL for the existing operation panel 42.

Figure 6:
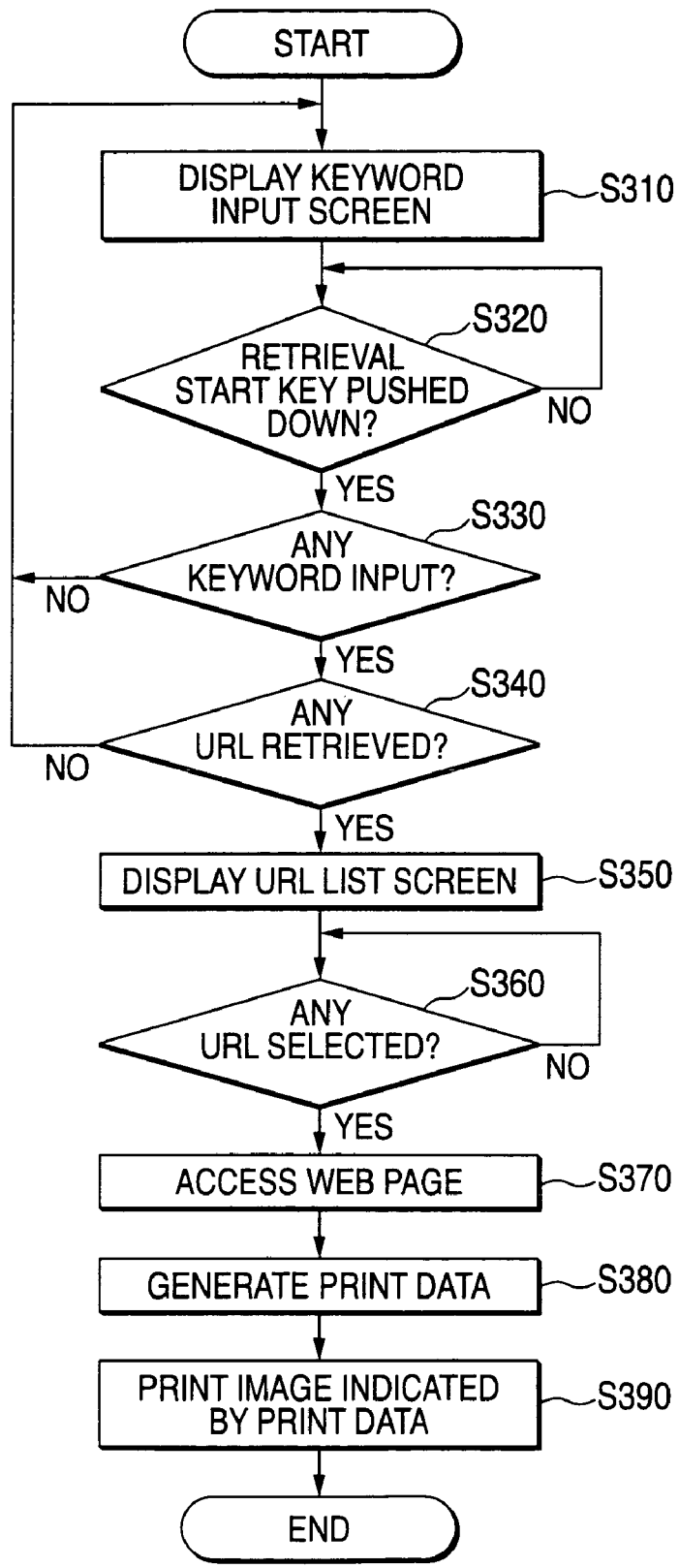
FIG. 6 is a flow chart showing a procedure of a Web searching process according to the first embodiment or a third embodiment of the invention.

After the step S310 in FIG. 6, an operation of inputting any keyword and an operation of pushing down the retrieval start key may be further carried out to retrieve URLs corresponding to the input keyword from the URLs registered in the data table in the step S340. Then, after a Web page selected by the user in the step S360 from Web pages of the URLs detected by the retrieval is accessed in the step S370, the accessed Web page can be printed in the steps S380 and S390. Accordingly, the user can designate (select) URLs registered in the data table (recorded in the RAM 16) on the basis of keywords corresponding to the URLs, so that a Web page of a designated URL can be printed. Particularly since arbitrary keywords entered by the user are registered in the data table, the user can accurately designate a URL of a Web page to be browsed if URLs are registered so as to be associated with keywords reflecting contents of information provided by Web pages of the URLs.

Only the Web page of the URL selected in the step S360 in FIG. 6 is printed in the step S390. In this manner, the user can select a URL of a Web page (to be accessed in the step S370) to print an image of the Web page. Accordingly, if URLs of Web pages that the user does not want to browse through the sheet of paper are contained in a plurality of URLs detected in the step S340, the user can select URLs except the URLs of the unnecessary Web pages to thereby prevent the Web pages that the user does not want to browsed from being printed wastefully.

When a decision is made in the step S240 in FIG. 5 that no keyword is contained in the contents specified in the step S210 though a decision is made in the step S220 that any URL is contained in the contents specified in the step S210, the Web page of the URL contained in the contents can be printed in the step S280. Accordingly, when the sheet of paper printed in the Web printing process in FIG. 3 is read by the composite machine 1 in the condition that no character is written in the entry column 6 (Web command process in FIG. 5), the user can print and browse the same Web page repeatedly without a series of operations of designating the URL. Accordingly, when, for example, the Web page is such that the contents of the Web page printed in the Web printing process in FIG. 3 are updated frequently, the user can print and browse the updated Web page having the newest contents if the sheet of paper on which the Web page is printed is read by the composite machine 1 in the condition that no character is written in the entry column 6.

Second Embodiment

A composite machine 2 according to a second embodiment has the same configuration as that of the composite machine 1 according to the first embodiment except that the composite machine 2 differs from the composite machine 1 in partial configuration and partial processing contents. The point of difference will be described in detail.

The operation panel 42 of the user I/F 40 included in the composite machine 2 has a keyword print key for starting a keyword notifying process (FIG. 8) which will be described later, as a key other than the character keys, the Web print key, the scan key, the retrieval start key and the retrieval interrupt key.

Keyword Notifying Process by CPU 12

The keyword notifying process executed by the CPU 12 included in the composite machine 2 will be described below with reference to FIG. 8. The keyword notifying process is started when the keyword print key on the operation panel 42 is pushed down.

The CPU 12 first generates print data indicating a keyword notifying image on the basis of the data table recorded in the RAM 16 (S410). In the step S410, as shown in FIG. 9, image data of such an image that keywords 7 registered in the data table and mark columns 8 corresponding to the keywords 7 are written in a specific position (region) of a sheet of paper is generated as the print data.

The CPU 12 then operates so that the image expressed by the print data generated in the step S410 is printed on a sheet of paper (S420). In the step S420, the CPU 12 instructs the printer unit 36 to print the image expressed by the print data generated in the step S410, so that the image expressed by the print data is printed on the sheet of paper (see FIG. 9). Incidentally, the user can select a keyword 7 corresponding to a mark column 8 by checking off (marking) the inside of the square forming the mark column 8, for example, with "v" or "/" in the sheet of paper printed in the step S420.

Web Searching Process by CPU 12

The Web searching process executed by the CPU 12 included in the composite machine 2 will be described below with reference to FIG. 10. The Web searching process has the same procedure as that shown in FIG. 6 according to the first embodiment except partial difference which will be described in detail (see the hatched portions in FIG. 10). Incidentally, steps shown in FIG. 10 and equal in index (SXXX: X is an arbitrary number) to those shown in FIG. 6 are carried out in the same manner as shown in FIG. 6.

The CPU 12 first operates so that a message for urging the user to set a sheet of paper is displayed (S312). In the step S312, a control signal for displaying a message for urging the user to set the sheet of paper printed in the keyword notifying process (FIG. 8) in the reading position is supplied to the display panel 44. Upon reception of the control signal as an input signal, the display panel 44 displays the message. After the keyword input screen is displayed, the user can set the sheet of paper in the reading position and can carry out the operation of pushing down the retrieval start key on the operation panel 42.

The CPU 12 then waits till the retrieval start key is pushed down (S320: NO).

When the retrieval start key is pushed down in the step S320 (S320: YES), the CPU 12 operates so that an image is read from a specific position (region) of the sheet of paper to specify contents written in the specific position (S322). In the step S322, the CPU 12 first instructs the scanner unit 32 to read the image from the specific position (region) of the sheet of paper, so that the image is read from the specific position of the sheet of paper. The term "specific position" means a position that is set in advance as coordinates indicating the position where each mark column 8 is printed in the keyword notifying process (FIG. 8). The scanner unit 32 reads the image from the position indicated by the coordinates. Then, a process (OCR) of recognizing keywords 7 corresponding to marked ones of the mark columns 8 while recognizing the marked ones of the mark columns 8 from the read image on the basis of positions corresponding to the mark columns 8 is carried out. In this manner, if there are mark columns 8 marked in the specific positions, keywords corresponding to the mark columns 8 are specified. The keywords specified thus are used as keywords input by the user.

Then, if there is no keyword specified as a content in the step S322 (S322: NO), the CPU 12 goes back to the step S312.

On the other hand, if there is any keyword specified as a content in the step S322 (S322: YES), the CPU 12 retrieves a URL corresponding to the keyword specified in the step S322 from URLs registered in the data table on the basis of the data table recorded in the RAM 16.

If there is no URL detected in the step S342 (S342: NO), the CPU 12 goes back to the step S312.

On the other hand, if there is any URL detected in the step S342 (S342: YES), the CPU 12 operates so that a URL list screen is displayed (S350).

Then, the CPU 12 waits till a URL selecting operation is carried out (S360: NO).

When the URL selecting operation is carried out in the step S360 (S360: YES), the CPU 12 accesses a Web page of the selected URL (S370).

Then, the CPU 12 generates print data (S380).

Then, the CPU 12 operates so that the image expressed by the print data generated in the step S380 is printed on the sheet of paper (S390).

Advantages of the Second Embodiment

In the composite machine 2 configured as described above, the following advantages other than the same advantages as in the composite machine 1 according to the first embodiment can be obtained.

Firstly, all keywords 7 registered in the data table and mark columns 8 corresponding to the keywords 7 respectively can be printed in the keyword notifying process shown in FIG. 8. Accordingly, the user can confirm keywords 7 corresponding to the mark columns 8, that is, keywords registered in the data table (recorded in the RAM 16) on the basis of the sheet of paper printed in the keyword notifying process shown in FIG. 8.

Figure 10:
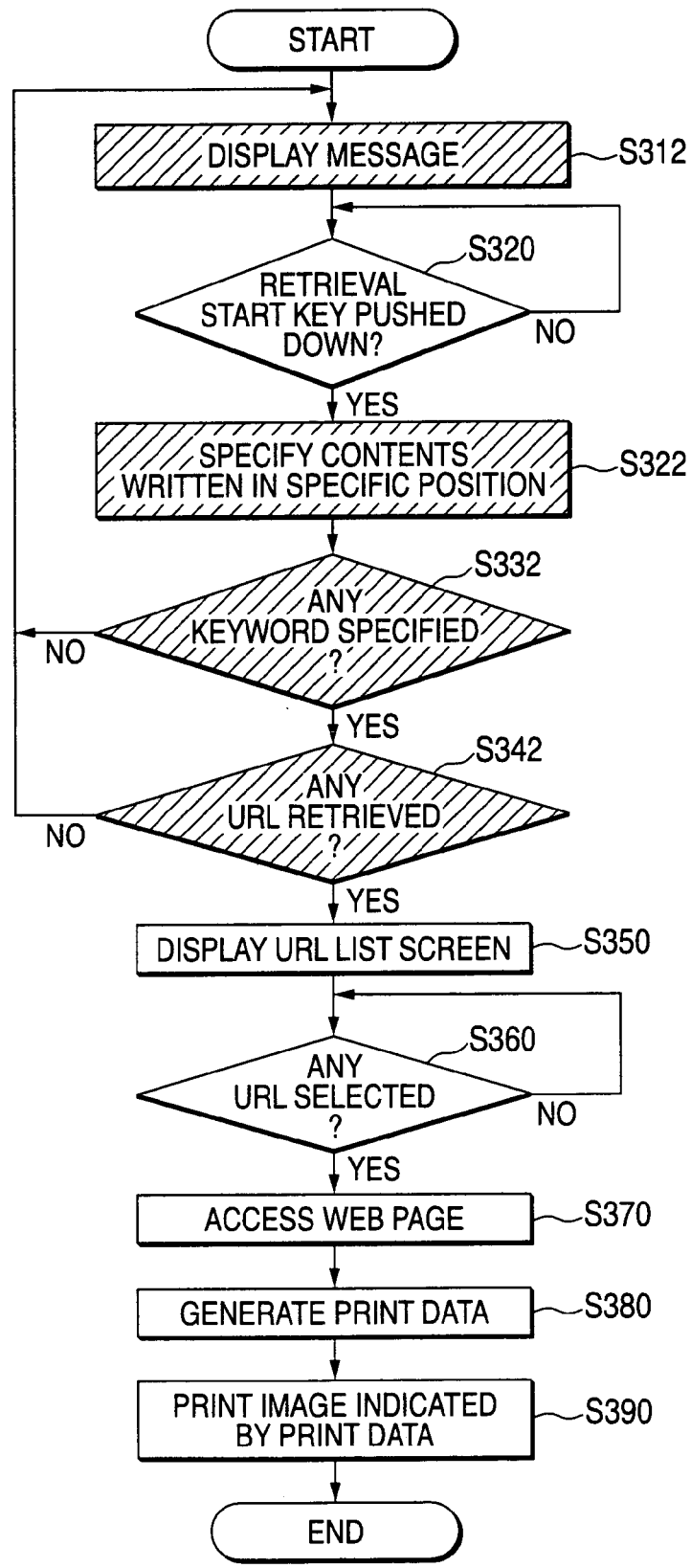
FIG. 10 is a flow chart showing a procedure of a Web searching process according to the second embodiment of the invention.

Secondly, marked ones of the mark columns 8 are read from the sheet of paper, and keywords 7 corresponding to the read mark columns 8 are recognized as keywords input by the user in the step S322 shown in FIG. 10. Accordingly, when the sheet of paper is read by the composite machine 2 (Web command process shown in FIG. 10) after the user checks off (marks) required ones of the mark columns 8 printed on the sheet of paper, keywords corresponding to the marked ones of the mark columns 8 can be input.

Third Embodiment

A composite machine 3 according to a third embodiment has the same configuration as that of the composite machine 1 according to the first embodiment except that the composite machine 3 differs from the composite machine 1 in partial configuration and partial processing contents. The point of difference will be described in detail.

Web Printing Process by CPU 12

The Web printing process executed by the CPU 12 included in the composite machine 3 will be described below. The Web printing process has the same procedure as that shown in FIG. 3 in the first embodiment except a partial different point which will be described in detail.

the CPU 12 first accesses a Web page of a URL designated through the operation panel 42 (S110).

Figure 11:
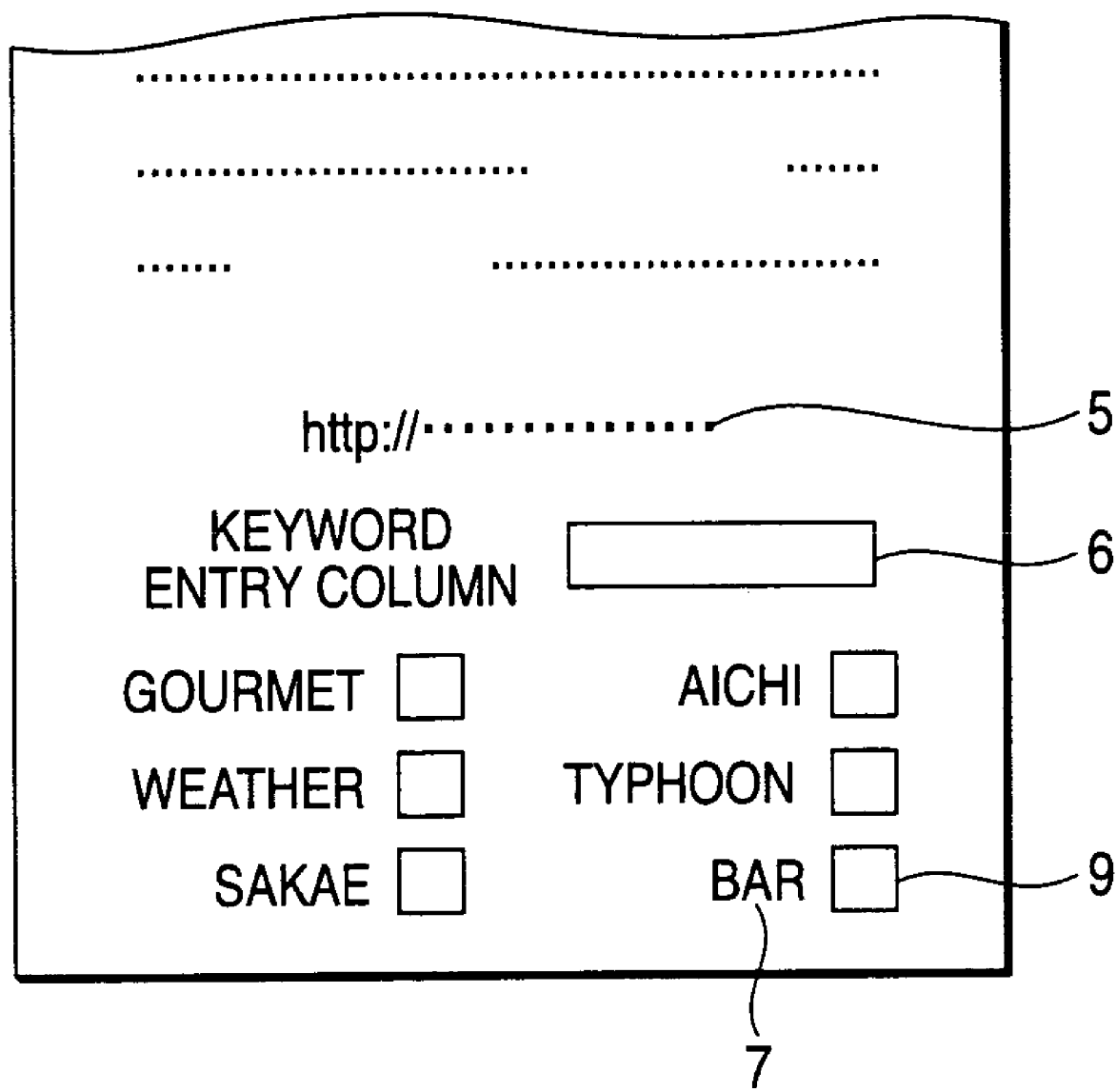
FIG. 11 is a view showing a sheet of paper printed in a Web printing process according to the third embodiment of the invention.

Then, the CPU 12 generates print data (S120). In the step S120, as shown in FIG. 11, image data of an image in which a character string 5 indicating the URL of the Web page, an entry column 6 for making the user enter an arbitrary keyword, keywords 7 registered in the data table and mark columns 9 corresponding to the keywords 7 respectively are written in a specific position (region) at a lower end of the image of the Web page accessed in the step S110 is generated as the print data.

The CPU 12 then operates so that the image expressed by the print data generated in the step S120 is printed on a sheet of paper (S130). Incidentally, the user can select keywords 7 corresponding to required ones of the mark columns 9 by checking off (marking) the inside of the square forming each mark column 9, for example, with "v" or "/" on the sheet of paper printed in the step S130.

Web Scanning Process by CPU 12

The Web scanning process executed by the CPU 12 included in the composite machine 3 will be described below with reference to FIG. 12. The Web scanning process has the same procedure as that shown in FIG. 5 according to the first embodiment except partial difference which will be described in detail (see the hatched portions in FIG. 12). Incidentally, steps shown in FIG. 12 and equal in index (SXXX: X is an arbitrary number) to those shown in FIG. 5 are carried out in the same manner as shown in FIG. 5.

The CPU 12 first operates so that an image is read from a specific position (region) of the sheet of paper to specify the content written in the specific position (S212). In the step S212, the CPU 12 first instructs the scanner unit 32 to read the image from the specific position (region) of the sheet of paper, so that the image is read from the specific position of the sheet of paper. The term "specific position" means a position that is set in advance as coordinates indicating the position where each of the character string 5, the entry column 6, the keywords 7 and the mark columns 9 is printed in the Web printing process (FIG. 3). The scanner unit 32 reads the image from the position indicated by the coordinates. Then, a process (OCR) of recognizing characters written in the position corresponding to each of the character string 5 and the entry column 6 from the read image is carried out. In this manner, if a character string 5 indicating the URL is written in the specific position, the character string 5 is specified. If a keyword is written in the entry column 6 of the specific position, the keyword is specified. In addition, a process (OCR) of recognizing keywords 7 corresponding to marked ones of the mark columns 9 while recognizing the marked ones of the mark columns 8 from the read image on the basis of positions corresponding to the mark columns 9 is carried out. In this manner, if there are mark columns 9 marked in the specific positions, keywords corresponding to the mark columns 9 are specified.

The CPU 12 then checks whether any URL is contained in the contents specified in the step S212 or not (S220).

When making a decision in the step S220 that no URL is contained (S220: NO), the CPU 12 notifies the fact that the sheet of paper set in the reading position is not the sheet of paper printed in the Web printing process (FIG. 3) (S230).

After the step S230 is completed, the CPU 12 terminates the Web scanning process.

When making a decision in the step S220 that any URL is contained (S220: YES), the CPU 12 checks whether any keyword is contained in the contents specified in the step S212 or not (S240).

When making a decision in the step S240 that any keyword is contained (S240: YES), the CPU 12 registers the URL specified in the step S210 in the data table recorded in the RAM 16 while associating the URL with the character string indicating the keyword specified together with the URL (S250).

After the step S250 is completed or when making a decision in the step S240 that no keyword is contained (S240: NO), the CPU 12 registers keywords corresponding to the mark columns 9 specified in the step S212 in the data table recorded in the RAM 16 while associating the keywords with the URLs specified together with the keywords (S244) if the keywords corresponding to the mark columns 9 are specified (S242: YES). Incidentally, in the step S244, if there is no data table recorded in the RAM 16, a data table is generated so that keywords corresponding to the mark columns 9 specified in the step S212 are registered in the data table while associated with the URLs specified together with the keywords (see FIG. 2).

On the other hand, if there is no keyword corresponding to each mark column f specified as a content in the step S212 (S242: NO), the Web page of the URL specified in the step S210 is accessed (S260).

Then, the CPU 12 generates print data (S270).

Then, the CPU 12 operates so that an image expressed by the print data generated in the step S270 is printed on a sheet of paper (S280).

After the image is printed in the step S280 or after data is registered in the step S244, the CPU 12 terminates the Web scanning process.

Advantages of the Third Embodiment

In the composite machine 3 configured as described above, the following advantages other than the same advantages as in the composite machine 1 according to the first embodiment can be obtained.

Firstly, keywords 7 registered in a database and mark columns 9 corresponding to the keywords 7 respectively can be printed together with the character string 5 indicating the URL and the entry column 6 in the step S130 in FIG. 3. When marked ones of the mark columns 9 are read from the sheet of paper in the step S212 in FIG. 12, keywords corresponding to the read mark columns 9 can be registered in the data table (recorded in the RAM 16) in the step S244. Accordingly, if any keyword to be registered so as to be associated with a URL is present in keywords corresponding to the mark columns 9 printed on the sheet of paper, that is, in registered (recorded) keywords, the keyword corresponding to the marked mark column 9 can be registered (recorded) so as to be associated with the URL when the sheet of paper is read by the composite machine 3 (Web command process in FIG. 12) after the user checks off (marks) a mark column f corresponding to the keyword to be registered even in the case where the user does not write any keyword in the entry column 6.

Secondly, in this configuration, when the sheet of paper is read by the composite machine 3 after the user checks off a required mark column 9, the URL can be registered so as to be associated with the keyword corresponding to the mark column 9, that is, the same keyword as one of registered (recorded) keywords. Accordingly, even in keywords different from or similar to the registered keywords are written in the entry column 6 by mistake, a plurality of URLs to be registered so as to be associated with one keyword can be prevented from being registered so as to be associated with different keywords respectively.

Correlation with the Invention

Each of the composite machines 1, 2 and 3 according to the embodiments constitute a communication terminal in the invention. The RAM 16 constitutes a recording medium in the invention. The communication software program incorporated in the ROM 14 constitutes an access unit in the invention. The scanner unit 32 constitutes a reading unit in the invention. The printer unit 36 constitutes a printing unit in the invention.

The steps S120 and S130 in FIG. 3 constitute a first print instruction unit in the invention.

The step S210 in FIG. 5 and the step S212 in FIG. 12 constitute a read instruction unit in the invention. The steps S250 and S244 in FIGS. 5 and 12 constitute a record instruction unit in the invention. The step S260 in FIGS. 5 and 12 constitute a second access instruction unit in the invention. The steps S270 and S280 in FIGS. 5 and 12 constitute a fourth print instruction unit in the invention.

The step S340 in FIG. 6 and the step S342 in FIG. 10 constitute a retrieval unit in the invention. The step S370 in FIGS. 4 and 10 constitutes a first access instruction unit in the invention. The step S360 in FIGS. 6 and 10 constitutes a page selection unit in the invention. The steps S380 and S390 in FIGS. 6 and 10 constitute a second print instruction unit in the invention.

The steps S410 and S420 in FIG. 8 constitute a third print instruction unit in the invention.

The steps S312 to S322 in FIG. 10 constitute a keyword input unit in the invention.

In the invention, URLs of Web pages are used as access data.

The mark columns 8 printed in the keyword notifying process (FIG. 8) according to the second embodiment disabled first mark columns in the invention.

The mark columns 9 printed in the Web printing process (FIG. 3) according to the third embodiment constitute second mark columns in the invention.

Modifications

Although embodiments of the invention have been described, the invention is not limited to the specific embodiments and various modifications may be made as other embodiments.

For example, the embodiments have been described on the case where the configuration of the communication terminal according to the invention is applied to the composite machines 1, 2 and 3. The configuration of the communication terminal according to the invention, however, may be applied to another apparatus than the composite machines 1, 2 and 3 if the apparatus has a Web printing function (a function for performing data communication through the Internet).

The embodiments have been described on the case where the communication terminal according to the invention is constituted by the single composite machine 1, 2 or 3. The communication terminal according to the invention, however, may be constituted by a combination of one of the composite machines 1, 2 and 3 and another communication terminal than the composite machines 1, 2 and 3 or may be constituted by a combination of a plurality of other communication terminals than the composite machines 1, 2 and 3.

The embodiments have been described on the case where each of the processes shown in FIGS. 3, 5, 6, 8, 10 and 12 is designed to be executed by a computer system constituted by the CPU 12 included in the composite machine 1, 2 or 3. Part or all of each of these processes, however, may be designed to be executed by another computer system connected to the composite machine 1, 2 or 3 by radio or through a wire signal transmission path.

The embodiments have been described on the case where each of the processes shown in FIGS. 3, 5, 6, 8, 10 and 12 is designed to be executed according to a procedure stored in the ROM 14 included in the composite machine 1, 2 or 3. When the composite machine 1, 2 or 3 is formed so that data input/output can be performed between the composite machine 1, 2 or 3 and a recording medium such as an FD or a memory card, each of the processes may be designed to be executed according to a procedure recorded in the recording medium.

The embodiments have been described on the case where the composite machine 1, 2 or 3 is connected to a WAN (Wide Area Network) of the Internet 200. The composite machine 1, 2 or 3, however, may be also used in the case where it is connected to an LAN (Local Area Network).

The embodiments have been described on the case where the data table is designed to be recorded in the RAM 16. When the composite machine 1, 2 or 3 is formed so that data can be recorded/read in/from another recording medium (such as a hard disk or a memory card) than the RAM 16, the data table, however, may be designed to be recorded in the recording medium.

The embodiments have been described on the case where configuration is made so that a character string 5 indicating a URL and an entry column 6 are printed on specific positions of a sheet of paper in the step S120 in FIG. 3, and the URL indicated by the character string 5 and a keyword written in the entry column 6 are specified from positions set in advance as the specific positions in the step S120 in FIG. 5 (or in the step S212 in FIG. 12). Configuration, however, may be made so that a character string 5 indicating a URL and an entry column 6 are printed together with identification information (such as characters, symbols, graphics, etc.) for identifying positions of the character string 5 and the entry column 6 respectively in the step S120 in FIG. 3, and the character string 5 indicating the URL and a keyword entered in the entry column 6 are specified on the basis of the identification information printed on the sheet of paper in the step S210 in FIG. 5 (or in the step S212 in FIG. 12).

The embodiments have been described on the case where configuration is made so that only the image of the Web page of the URL selected in the step S360 in FIG. 6 (or in FIG. 10) is printed in the step S390. Configuration, however, may be made so that after the step S340 (or S342), the process skips over the steps S350 and S360 to the step S370, and all Web pages of URLs detected in the step S340 (or the step S342) are printed in the step S390.

The embodiments have been described on the case where configuration is made so that image data of only the Web page is generated as print data in the step S270 in FIG. 5 (or in FIG. 12) or in the step S380 in FIG. 6 (or in FIG. 10). Each of these steps, however, may be formed in the same manner as the step S120 in FIG. 3 so that image data of an image obtained by addition of the character string 5, the entry column 6, etc. in specific positions (regions) at a lower end of the image of the Web page is generated as print data.

The second embodiment has been described on the case where configuration is made so that keywords 7 and mark columns 8 are printed on specific positions of a sheet of paper in the step S420 in FIG. 8, and keywords corresponding to marked ones of the mark columns 8 are specified from positions set in advance as the specific positions in the step S322 in FIG. 10. Configuration, however, may be made so that keywords 7 and mark columns 8 are printed together with identification information (such as characters, symbols, graphics, etc.) for identifying positions of the keywords 7 and the mark columns 8 respectively in the step S420 in FIG. 8, and keywords corresponding to marked ones of the mark columns 8 are specified on the basis of the identification information printed on the sheet of paper in the step S322 in FIG. 10.

The third embodiment has been described on the case where configuration is made so that keywords 7 and mark columns 9 are printed on specific positions of a sheet of paper is the step S130 in FIG. 3, and keywords corresponding to marked ones of the mark columns 9 are specified from positions set in advance as the specific positions in the step S212 in FIG. 12. Configuration, however, may be made so that keywords 7 and mark columns 9 are printed together with identification information (such as characters, symbols, graphics, etc.) for identifying positions of the keywords 7 and the mark columns 9 respectively in the step S130 in FIG. 3, and keywords corresponding to marked ones of the mark columns 9 are specified on the basis of the identification information printed on the sheet of paper in the step S212 in FIG. 12.

The embodiments have been described on the case where configuration is made so that image data of the Web page accessed in the step S370 in FIG. 6 (or in FIG. 10) is generated as the print data, and an image expressed by the print data generated in the step S380 in FIG. 6 (or in FIG. 10) is printed on a sheet of paper. The composite machine 1, 2 or 3 may have a display unit configured to display the Web page accessed in the step S370 in FIG. 6 (or in FIG. 10). The display panel 44 in FIG. 1 may be configured to serve as such a display unit.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication terminal used in a state where the communication terminal is connected to a network, comprising:
   an access unit configured to access a predetermined Web page through the network on the basis of access data for accessing the predetermined Web page;
   a printing unit configured to print a predetermined image on a printing medium;
   a reading unit configured to read the image printed on the printing medium;
   a recording medium configured to record various pieces of data including keywords and character strings;
   a first print instruction unit that causes the printing unit to print a character string indicating the access data of the Web page and an entry column in addition to an image of the Web page accessed by the access unit;
   a read instruction unit configured to instruct the reading unit to read the character string indicating the access data and information in the entry column from the printing medium printed in accordance with an instruction given from the first print instruction unit; and
   a record instruction unit that causes the recording medium to record the character string and written information read in accordance with an instruction given from the read instruction unit, the written information that is written after the entry column is printed on the printing medium, while associating the character string with the written information as the keyword.

2. The communication terminal according to claim 1, further comprising:
   a keyword input unit configured to receive an input designating an arbitrary keyword as an input keyword;
   a retrieval unit configured to retrieve a character string from the character strings recorded in the recording medium associated with the keyword corresponding to the input keyword;
   a first access instruction unit configured to instruct the access unit to access a Web page based on the access data indicated by the character string detected by the retrieval unit; and
   a second print instruction unit configured to instruct the printing unit to print the Web page accessed in accordance with an instruction given from the first access instruction unit.

3. The communication terminal according to claim 2, further comprising a page selection unit configured to receive a selection of a Web page with an images to be printed from Web pages of the access data indicated by the character string detected by the retrieval unit,
   wherein the first access instruction unit instructs the access unit to access the Web page selected by the page selection unit.

4. The communication terminal according to claim 2, wherein the keyword input unit includes keys.

5. The communication terminal according to claim 2, further comprising a third print instruction unit configured to instruct the printing unit to print all keywords recorded in the recording medium and first mark columns corresponding to the keywords.
   wherein the keyword input unit instructs the reading unit to read the first mark columns from the printing medium printed in accordance with an instruction given from the third print instruction unit and uses the keywords corresponding to a mark written in the first mark columns read by the reading unit as the input keyword, the mark that is written after the first mark columns are printed on the printing medium.

6. The communication terminal according to claim 1, wherein:
   the first print instruction unit instructs the printing unit to print keywords recorded in the recording medium and second mark columns corresponding to the keywords as well as the character string and the entry column;
   the read instruction unit instructs the reading unit to read the second mark columns as well as the character string and the keywords from the printing medium printed in accordance with an instruction given from the first print instruction unit; and
   the record instruction unit instructs the recording medium to record the keyword corresponding to a mark written in the second mark columns while associating the keyword with the character string read together with the second mark columns when the second mark columns are read in accordance with an instruction given from the read instruction unit, the mark that is written after the second mark columns are printed on the printing medium.

7. The communication terminal according to claim 1, further comprising:
   a second access instruction unit configured to instruct the access unit to access a Web page based on the access data indicated by the character string when only the character string is read in accordance with an instruction given from the read instruction unit; and
   a fourth print instruction unit configured to instruct the printing unit to print the Web page accessed in accordance with an instruction given from the second access instruction unit.

8. The communication terminal according to claim 1, further comprising:
   a keyword input unit configured to receiving an input designating an arbitrary keyword as an input keyword;
   a retrieval unit configured to retrieve a character string from the character strings recorded in the recording medium associated with the keyword corresponding to the input keyword;
   a first access instruction unit configured to instruct the access unit to access a Web page based on the access data indicated by the character string detected by the retrieval unit; and
   a display unit configured to display the Web page accessed in accordance with an instruction given from the first access instruction unit.

9. A storage medium storing a terminal control program for causing a computer system execute procedures for controlling a communication terminal used in a state where the communication terminal is connected to a network, the communication terminal including an access unit configured to access a predetermined Web page through the network on the basis of access data for accessing the predetermined Web page, a printing unit configured to print a predetermined image on a printing medium, a reading unit configured to read the image printed on the printing medium, and a recording medium configured to record various pieces of data, the terminal control program comprising:
   a first print instruction unit that instructs the printing unit to print a character string indicating the access data of the Web page and an entry column in addition to the image of the Web page accessed by the access unit; and
   a read instruction unit that instructs the reading unit to read the character string indicating the access data and information in the entry column from the printing medium printed in accordance with an instruction given from the first print instruction unit; and a record instruction unit that instructs the recording medium to record the character string and written information read in accordance with an instruction given from the read instruction unit, the written information that is written after the entry column is printed on the printing medium, while associating the character string with the written information as the keyword.

10. The storage medium according to claim 9, wherein the computer program further comprising:

a keyword input unit that receives an input designating an arbitrary keyword as an input keyword;

a retrieval unit that retrieves a character string from character strings recorded in the recording medium associated with the keyword corresponding to the input keyword;

a first access instruction unit that instructs the access unit to access a Web page based on the access data indicated by the character string detected in the retrieval unit; and a second print instruction unit that instructs the printing unit to print the Web page accessed in accordance with an instruction given from the first access instruction unit.

11. A communication system used in a state where the communication system is connected to a network, comprising:

an access unit configured to access a predetermined Web page through the network on the basis of access data for accessing the predetermined Web page;

a printing unit configured to print a predetermined image on a printing medium;

a reading unit configured to read the image printed on the printing medium;

a recording medium configured to record various pieces of data including keywords and character strings;

a first print instruction unit that causes the printing unit to print a character string indicating the access data of the Web page and an entry column in addition to an image of the Web page accessed by the access unit;

a read instruction unit configured to instruct the reading unit to read the character string indicating the access data and information in the entry column from the printing medium printed in accordance with an instruction given from the first print instruction unit; and a record instruction unit that causes the recording medium to record the character string and written information read in accordance with an instruction given from the read instruction unit, the written information that is written after the entry column is printed on the printing medium, while associating the character string with the written information as the written information as the keyword.

12. The communication system according to claim 11, further comprising:

a keyword input unit configured to receive an input designating an arbitrary keyword as an input keyword;

a retrieval unit configured to retrieve a character string from the character strings recorded in the recording medium associated with the keyword corresponding to the input keyword;

a first access instruction unit configured to instruct the access unit to access a Web page based on the access data indicated by the character string detected by the retrieval unit; and a second print instruction unit configured to instruct the printing unit to print the Web page accessed in accordance with an instruction given from the first access instruction unit.

13. The communication system according to claim 12, further comprising a page selection unit configured to receive a selection of a Web page with an images to be printed from Web pages of the access data indicated by the character string detected by the retrieval unit, wherein the first access instruction unit instructs the access unit to access the Web page selected by the page selection unit.

14. The communication system according to claim 12, wherein the keyword input unit includes keys.

15. The communication system according to claim 12, further comprising a third print instruction unit configured to instruct the printing unit to print all keywords recorded in the recording medium and first mark columns corresponding to the keywords, wherein the keyword input unit instructs the reading unit to read the first mark columns from the printing medium printed in accordance with an instruction given from the third print instruction unit and uses keywords corresponding to a mark written in the first mark columns read by the reading unit as the input keyword, the mark that is written after the first mark columns are printed on the printing medium.

16. The communication system according to claim 11, wherein:

the first print instruction unit instructs the printing unit to print keywords recorded in the recording medium and second mark columns corresponding to the keywords as well as the character string and the entry column;

the read instruction unit instructs the reading unit to read the second mark columns as well as the character string and the keywords from the printing medium printed in accordance with an instruction given from the first print instruction unit; and the record instruction unit instructs the recording medium to record the keyword corresponding to a mark written in the second mark columns while associating the keyword with the character string read together with the second mark columns when the second mark columns are read in accordance with an instruction given from the read instruction unit, the mark that is written after the second mark columns are printed on the printing medium.

17. The communication system according to claim 11, further comprising:

a second access instruction unit configured to instruct the access unit to access a Web page based on the access data indicated by the character string when only the character string is read in accordance with an instruction given from the read instruction unit; and a fourth print instruction unit configured to instruct the printing unit to print the Web page accessed in accordance with an instruction given from the second access instruction unit.

\* \* \* \* \*